United States Patent
Oroskar et al.

(10) Patent No.: US 10,015,774 B1
(45) Date of Patent: Jul. 3, 2018

(54) METHOD AND SYSTEM FOR CONTROLLING A NETWORK'S PAGING OF A WIRELESS CLIENT DEVICE BASED ON WHETHER THE WIRELESS CLIENT DEVICE PROVIDES CONNECTIVITY BETWEEN AT LEAST ONE OTHER DEVICE AND THE NETWORK

(71) Applicant: Sprint Spectrum L.P., Overland Park, KS (US)

(72) Inventors: Siddharth S. Oroskar, Overland Park, KS (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 52 days.

(21) Appl. No.: 15/359,195

(22) Filed: Nov. 22, 2016

(51) Int. Cl.
| | |
|---|---|
| *H04W 68/00* | (2009.01) |
| *H04W 68/02* | (2009.01) |
| *H04W 8/08* | (2009.01) |
| *H04W 88/04* | (2009.01) |

(52) U.S. Cl.
CPC ............. *H04W 68/02* (2013.01); *H04W 8/08* (2013.01); *H04W 88/04* (2013.01)

(58) Field of Classification Search
USPC .................................................. 370/328, 352
See application file for complete search history.

(56) References Cited

U.S. PATENT DOCUMENTS

| | | | | | |
|---|---|---|---|---|---|
| 8,908,598 | B1* | 12/2014 | Oroskar | ............... | H04W 68/02 370/328 |
| 8,929,927 | B1* | 1/2015 | Oroskar | ............... | H04W 68/02 370/352 |
| 9,198,083 | B1* | 11/2015 | Rai | ....................... | H04W 28/18 |
| 9,288,728 | B1* | 3/2016 | Talley | ................... | H04W 36/14 |
| 9,345,060 | B1* | 5/2016 | Ramamurthy | ........ | H04W 76/18 |
| 9,642,043 | B1* | 5/2017 | Drailing | ............ | H04W 36/0022 |
| 9,706,583 | B1* | 7/2017 | Pawar | ................... | H04W 76/10 |
| 9,749,907 | B1* | 8/2017 | Oroskar | ................ | H04W 76/18 |
| 9,769,794 | B1* | 9/2017 | Sitaram | ................ | H04W 68/02 |
| 9,794,416 | B1* | 10/2017 | Oroskar | ................ | H04M 7/006 |
| 2015/0038180 | A1 | 2/2015 | Quick, Jr. et al. | | |
| 2015/0289110 | A1 | 10/2015 | Kilpatrick, II et al. | | |
| 2015/0289229 | A1 | 10/2015 | Ahluwalia et al. | | |
| 2015/0327112 | A1 | 11/2015 | Kant et al. | | |

FOREIGN PATENT DOCUMENTS

WO        2016059063  A1    4/2016

* cited by examiner

*Primary Examiner* — David Q Nguyen (57) ABSTRACT

Disclosed is a method and system for controlling paging by a radio access network (RAN), where the RAN provides multiple cells in which to serve wireless client devices (WCDs). In an example method, if the RAN determines that a WCD is configured to provide connectivity between at least one other device and the RAN, the RAN then pages the WCD using a first mode in which an initial page attempt of a sequence of page attempts is in just the WCD's cell of last registration and a subsequent page attempt of the sequence is in at least a wider region around the WCD's cell of last registration. Whereas, if the RAN determines that the WCD is not configured to provide such connectivity, the RAN instead pages the WCD using a second mode in which each page attempt of the sequence is in just the WCD's cell of last registration.

20 Claims, 3 Drawing Sheets

METHOD AND SYSTEM FOR CONTROLLING A NETWORK'S PAGING OF A WIRELESS CLIENT DEVICE BASED ON WHETHER THE WIRELESS CLIENT DEVICE PROVIDES CONNECTIVITY BETWEEN AT LEAST ONE OTHER DEVICE AND THE NETWORK

BACKGROUND

In a typical wireless communication system, wireless service providers may operate radio access networks (RANs), each RAN including a number of base stations that each radiate to provide coverage in which wireless client devices (WCDs) such as cell phones, tablet computers, tracking devices, embedded wireless modules, and other wirelessly equipped devices, can operate. In turn, each base station may be coupled with network infrastructure that provides connectivity with one or more transport networks, such as the public switched telephone network (PSTN) and/or the Internet for instance. With this arrangement, a WCD within coverage of the RAN may engage in air interface communication with a base station and may thereby communicate via the base station with various remote network entities or with other WCDs served by the base station.

In practice, physical base station equipment in such a RAN may be configured to provide multiple specific coverage areas, or "cells," differentiated from each other by direction, carrier frequency, or the like. For simplicity in this description, however, each cell may be considered to correspond with a respective base station and each base station may be considered to correspond with a respective cell. Thus, an arrangement where physical base station equipment provides multiple cells could be considered to effectively include multiple base stations, each providing a respective one of those cells.

Further, a RAN may operate in accordance with a particular air interface protocol or "radio access technology," with communications from the base stations to WCDs defining a downlink or forward link and communications from the WCDs to the base stations defining an uplink or reverse link. Examples of existing air interface protocols include, without limitation, Orthogonal Frequency Division Multiple Access (OFDMA (e.g., Long Term Evolution (LTE) or Wireless Interoperability for Microwave Access (WiMAX)), Code Division Multiple Access (CDMA) (e.g., 1xRTT and 1xEV-DO), Global System for Mobile Communications (GSM), and Wi-Fi, among others. Each protocol may define its own procedures for managing communications with WCDs.

In accordance with the air interface protocol, each cell may operate on one or more carrier frequencies. Further, each cell may define a number of channels or specific resources for carrying signals and information between the base station and WCDs. For instance, on the downlink channel, certain resources may be used to carry a pilot or reference signal that WCDs may detect and measure as a basis to evaluate coverage, and other resources may be used to carry paging messages and other such control messages from the base station to WCDs. And on the uplink channel, certain resources may be used to carry registration requests and other control messages from WCDs to the base station. In addition, certain resources on the uplink and downlink may be set aside to carry bearer traffic (e.g., user communications) between the base station and the WCDs.

When a WCD first powers on or enters into coverage of a RAN, the WCD may search for a cell with the strongest coverage and may then register with the RAN by transmitting a registration message to the base station that provides that cell. The WCD may then operate in an idle mode or a connected (or active) mode in that cell. In the idle mode, the WCD may periodically monitor transmissions from the base station in search of any paging messages directed to the WCD and, upon detecting such a paging message or at the initiation of the WCD, may transmit a control message to the base station to facilitate transition to the connected mode. In the connected mode, the WCD may then engage in bearer communication, such as voice calls and/or data sessions, on air interface resources assigned by the base station.

Further, in both the idle mode and connected mode, the WCD may regularly monitor the strength of its serving cell and the strength of any other available cells, to help ensure that the WCD operates in the best available coverage. If the WCD detects that the strength of its serving cell is threshold low and/or that the strength of another cell is sufficiently high, and/or for other reasons, the WCD may then hand over to operate in the other cell. In the connected mode, this handover process would involve signaling between the WCD and the RAN to facilitate transfer of the WCD's connection to the new cell. Whereas, in the idle mode, the handover process may involve the WCD simply transitioning to idle in the new cell, beginning to monitor transmissions from the base station in the new cell in search of any paging messages directed to the WCD.

OVERVIEW

In practice, a RAN may include a paging controller, such as a mobile switching center (MSC) or mobility management entity (MME), that manages paging of WCDs. As a WCD may move from cell to cell, one function of the paging controller is to track where in the RAN the WCD is operating, so that when the paging controller has a paging message to send to the WCD, the paging controller can send the paging message to the appropriate base station(s) for transmission to the WCD.

To facilitate this, a RAN may be arranged to implement "paging zones," also known as "tracking areas." In such an arrangement, the base station cells in the RAN are divided into groups each defining a respective tracking area having a respective tracking area ID, and each base station in the RAN broadcasts its tracking area's ID. Further, the paging controller has a record of the tracking areas, so as to facilitate paging on a per-tracking-area basis. When a WCD first powers on or enters into coverage of the RAN and detects a strongest cell, the WCD notes the tracking area ID of that cell and registers by sending an initial "tracking-area update" (TAU) message, and the paging controller makes a record of the WCD's serving cell and tracking area. In turn, each time the WCD moves to a new cell, the WCD then determines if the tracking area ID of the new cell is the same as or different than the WCD's current tracking area ID, and the WCD re-registers with the RAN, by sending a new TAU, only if the tracking area ID is different—so as to notify the paging controller of the WCD's new serving cell and new tracking area.

Generally with this tracking area arrangement, when the paging controller has a paging message to send to a WCD, the paging controller may engage in a sequence of attempts to page the WCD until the paging controller completes the sequence or receives an acknowledgement from the WCD. In particular, the paging controller may page the WCD using a zone-based paging process in which the paging controller first attempts to reach the WCD in the WCD's cell of last registration, and then, for each successive page attempt, the paging controller broadens the region in which the WCD is paged to encompass more cells, on grounds that the WCD may have moved to another cell but not yet re-registered. For instance, the paging controller may transmit to the WCD an initial page attempt of the sequence in the WCD's cell of last registration and, absent an acknowledgement from the WCD to the initial page attempt, may then transmit to the WCD a subsequent page attempt of the sequence in a wider region around the cell of last registration, such as in one or more of the other cells of the WCD's tracking area.

Unfortunately, however, this paging process can be inefficient in that it involves not only paging in the cell where the WCD is operating but also paging in possibly many other cells where the WCD is not operating, thus unnecessarily burdening the downlink in those other cells.

One solution to this efficiency problem could be to configure the WCD to re-register with the RAN (by sending a new TAU) every time the WCD enters a new cell, even if the tracking area ID of the new cell is the same as the WCD's current tracking area ID—so as to notify the paging controller of the WCD's new serving cell. With that arrangement, the paging controller could page the WCD using a focused paging process in which the paging controller transmits each page attempt of the sequence in just the WCD's cell of last registration.

In some scenarios, however, that solution could in turn give rise to a different problem, in that WCDs would re-register with the RAN every time they move to new cells, thereby burdening the paging controller with excessive registration signaling.

On the other hand, the solution could prove useful when a WCD is fairly stationary. This is because a fairly stationary WCD would be less likely to move around into new cells and thus less likely to repeatedly re-register with the RAN and to burden the paging controller. Further, after a fairly stationary WCD registers in a particular cell, the WCD is more likely to operate in that cell for a long period of time, and thus the RAN is more likely to successfully page the WCD in that cell using the focused paging process.

An example of a WCD that is likely to be fairly stationary is a special WCD that provides wireless backhaul connectivity for a relay base station and for one or more conventional, end-user WCDs, such as cell phones or wirelessly-equipped computers, tablets, or other devices that do not provide such connectivity. The present disclosure draws a distinction between these special "relay-WCDs" and these end-user WCDs (also referred to as "non-relay WCDs").

In practice, a wireless service provider may implement small-cell base stations as relay base stations throughout the RAN to fill in coverage gaps between coverage of other base stations. Each relay base station may have a wireless backhaul connection with another base station of the RAN and may include or be interconnected (e.g., via a local area network or other connection) with a relay-WCD. With this relay arrangement, the RAN then serves the relay-WCD in much the same way that the RAN serves non-relay WCDs, and the relay base station itself serves non-relay WCDs in much the same way that any base station would. As such, the relay-WCD, together with the relay base station, is configured to provide connectivity between at least one other device-namely, at least one non-relay WCD—and the RAN.

In order to better fill in the coverage gaps, a relay base station is typically stationary, and thus, the relay-WCDs that are included or interconnected with the relay base stations are typically stationary as well, especially in comparison to non-relay WCDs. Consequently, it could be helpful for the RAN to selectively engage in the focused paging process for relay-WCDs and selectively engage in the zone-based paging process for non-relay WCDs.

The present disclosure provides for controlling paging of a WCD, based on a consideration of whether the WCD is configured to provide connectivity between at least one other device (e.g., at least one non-relay WCD) and the RAN. In accordance with the disclosure, when the RAN is going to page a given WCD, the RAN may be arranged to determine whether the WCD is configured to provide connectivity between at least one other device and the RAN, and to then use that determination as a basis for deciding whether to use the zone-based paging process to page the WCD or rather to use the focused paging process to page the WCD. For instance, if the RAN determines that the WCD does not provide such connectivity, the RAN will responsively decide to use the zone-based paging process, whereas if the RAN determines that the WCD does provide such connectivity, the RAN will responsively decide to use the focused paging process.

Further, in accordance with the disclosure, a WCD that is configured to provide connectivity between at least one other device and the RAN may be arranged to re-register with the RAN every time the WCD enters a new cell, even if the tracking area ID of the new cell is the same as the WCD's current tracking area ID, as noted above. Thus, if such a WCD does happen to enter a new cell, such as by moving into the new cell or being directed by the RAN to hand over to the new cell, the RAN can learn of that the WCD has entered the new cell and record the identity of the new cell.

With this arrangement, when a WCD is configured to provide the above-noted connectivity, the RAN may successfully page the WCD in just the WCD's cell of last registration without unnecessarily transmitting page messages in other cells. Further, the registration (TAU) signaling to the RAN may be reduced, since such a WCD is less likely to re-register with the RAN.

Accordingly, in one respect, disclosed herein is a method for controlling paging by a RAN, where the RAN provides multiple cells in which to serve WCDs, and where when the RAN pages a WCD, the RAN engages in a sequence of page attempts until the RAN completes the sequence or receives an acknowledgement from the WCD. The method involves detecting by the RAN a trigger to page a given WCD. Further, the method involves, responsive to detecting the trigger, the RAN making a determination of whether the given WCD is configured to provide connectivity between at least one other device and the RAN.

Still further, the method involves, if the determination is that the given WCD is not configured to provide connectivity between at least one other device and the RAN, then, responsive to the determination being that the given WCD is not configured to provide connectivity between at least one other device and the RAN, using by the RAN a first operational mode to page the given WCD, wherein, in the first operational mode, an initial page attempt of the sequence is in just a cell of last registration of the given WCD and a subsequent page attempt of the sequence is in at least a wider region around the cell of last registration of the given WCD. And yet further, the method involves, if the determination is that the given WCD is configured to provide connectivity between at least one other device and the RAN, then, responsive to the determination being that the given WCD is configured to provide connectivity between at least one other device and the RAN, using by the RAN a second operational mode rather than the first operational mode to page the given WCD, wherein, in the second operational mode, each page attempt of the sequence is in just the cell of last registration of the given WCD.

In another respect, disclosed is a RAN device in a RAN, where the RAN provides multiple cells in which to serve WCDs, and where, when the RAN pages a WCD, the RAN engages in a sequence of page attempts until the RAN completes the sequence or receives an acknowledgement from the WCD. The RAN device comprises a network communication interface, a processing unit, data storage, and program instructions stored in the data storage and executable by the processing unit to carry out operations in accordance with the method discussed above.

In another respect, disclosed is a method for controlling paging by a RAN, where the RAN provides multiple cells in which to serve WCDs, where when the RAN pages a WCD, the RAN engages in a sequence of page attempts until the RAN completes the sequence or receives an acknowledgement from the WCD, and where the RAN has two mutually exclusive operational modes for use in the RAN paging the WCD: (i) a first operational mode in which an initial page attempt of the sequence is in just a cell of last registration of the WCD and a subsequent page attempt of the sequence is in at least a wider region around the cell of last registration of the WCD and (ii) a second operational mode in which each page attempt of the sequence is in just the cell of last registration of the WCD. The method involves detecting by the RAN a trigger to page a given WCD. Further, the method involves, responsive to detecting the trigger, the RAN making a determination of whether the given WCD is configured to provide connectivity between at least one other device and the RAN. Still further, the method involves, based on the determination of whether the given WCD is configured to provide connectivity between at least one other device and the RAN, the RAN making a decision whether to use the first operational mode to page the given WCD or instead to use the second operational mode to page the given WCD. And yet further, the method involves the RAN paging the given WCD in accordance with the decision.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Referring to the drawings, as noted above, FIG. 1 is a simplified block diagram of an example RAN in which embodiments of the present method and system can be implemented. It should be understood, however, that the arrangement shown and described here and other arrangements and processes described in this document can take other forms. For instance, elements can be added, removed, combined, distributed, re-ordered, re-positioned, or otherwise changed. Further, features described herein as being carried out by one or more entities could be implemented by a programmed processing unit or by various other configurations, as those of ordinary skill in the art would understand.

Figure 1:
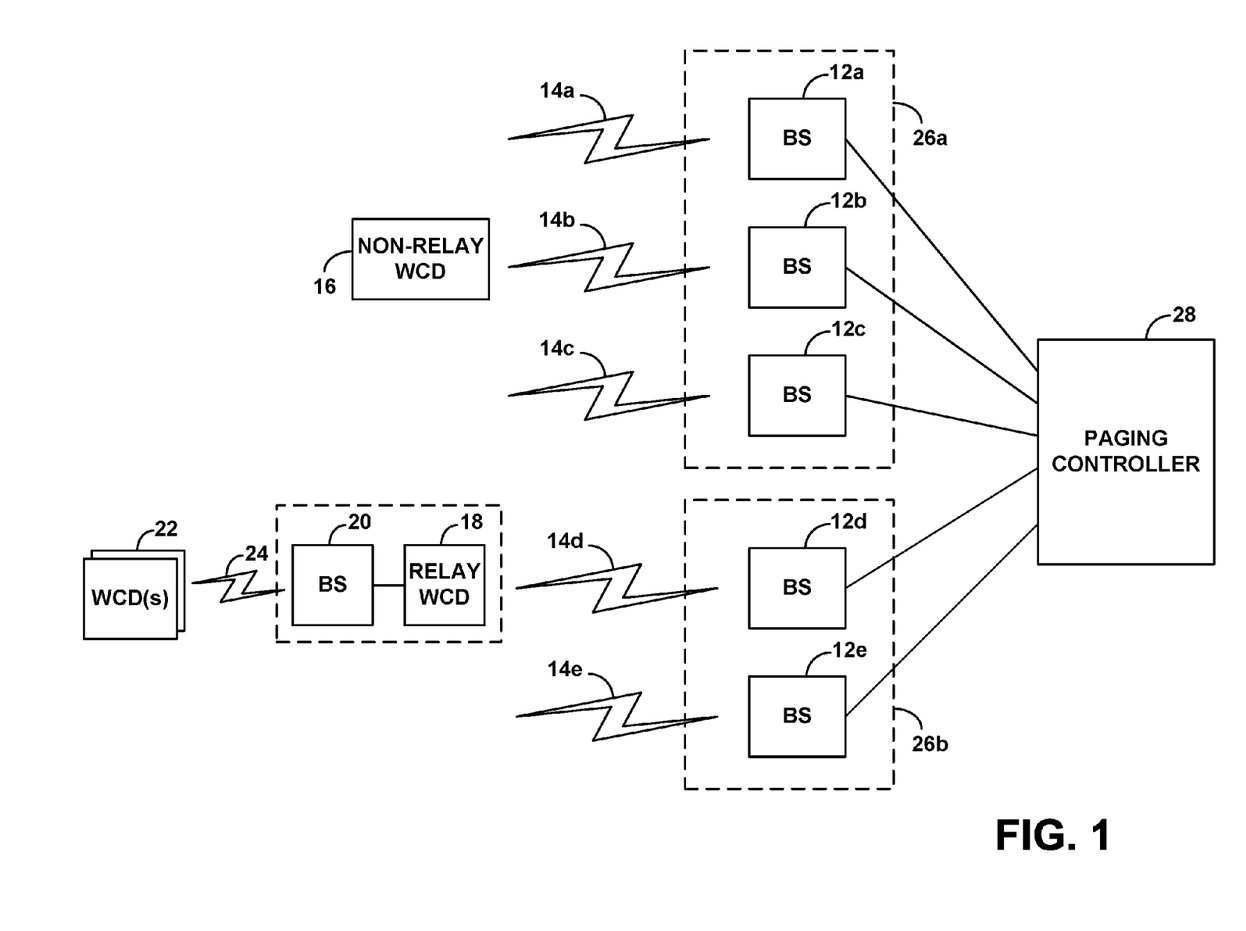
FIG. 1 is a simplified block diagram of an example network in which embodiments of the present method and system can be implemented.

The example RAN includes a plurality of base stations, five of which are shown in FIG. 1 as base stations 12a-12e, though other quantities are possible as well. These base stations could take any of a variety of forms, compliant with any of a variety of air interface protocols such as those noted above or others now known or later developed. Depending on the air interface protocol and other factors, the base stations could also be referred to by other names, such as evolved-Node-B's (eNodeBs), access nodes (ANs), access points (APs), base transceiver stations (BTSs), or the like. Further, the base stations could include macro base stations of the type typically implemented by cellular wireless service providers to cover broad areas, and/or small-cell base stations (e.g., femtocells, picocells, etc.) of the type typically used to cover smaller areas such as areas in homes, offices, or dense urban areas. As such, each base station would typically include an antenna structure, a transceiver, a radio that is compliant with a particular air interface protocol, and other components to facilitate general base station operation and any special operation described herein.

As shown, each representative base station radiates to define a respective cell. In particular, base station 12a radiates to define cell 14a, base station 12b radiates to define cell 14b, base station 12c radiates to define cell 14c, base station 12d radiates to define cell 14d, and base station 12e radiates to define cell 14e. As noted above, it is possible that some of these cells could emanate from the same physical base station equipment but could be differentiated from each other in various ways, such as by pointing in different directions or operating on different carrier frequencies for instance. For sake of discussion as noted above, the present disclosure will treat each cell as corresponding with a respective base station, and vice versa, though other arrangements are possible as well.

Shown in cell 14b is a typical end-user (non-relay) WCD 16 such as a cell phone or wirelessly-equipped computer, tablet, or other device that does not provide connectivity for at least one other device. On the other hand, shown in cell 14d is a WCD 18 that provides connectivity for at least one other device. Specifically, in line with the discussion above, WCD 18 is a relay-WCD that is coupled or integrated with a small-cell base station 20 and is configured (similar to base station 12d) to serve at least one non-relay WCD 22. As such, WCD 18 functions as an intermediary between base station 12d and any devices served by small-cell base station 20, with an air interface connection 24 between WCD 18 and base station 12d functioning as a wireless backhaul link for the small-cell base station 20. For sake of discussion, we can assume that WCDs 16 and 18 operate in an idle mode.

As noted above, when any such WCD (non-relay or relay) first powers on or enters into coverage of the RAN, the WCD may search for a cell with the strongest coverage and may then register with the RAN by transmitting a registration message to the base station that provides that cell, which may result in establishment of a radio-link-layer connection (e.g., radio resource control (RRC) connection) over the air interface between the WCD and the base station so that the base station can then serve the WCD.

In practice, each such WCD may store profile, configuration, or status information, such as data that specifies whether the WCD provides connectivity between at least one other device and the RAN. For instance, the WCD could store data that indicates whether the WCD is the type of device that provides such connectivity. By way of example, the WCD could store an indication of whether the WCD is configured to operate as a relay-WCD for a small-cell base station as discussed above. Or rather, as another example, the WCD could store an indication that the WCD is just an end-user WCD.

This WCD information could be established and stored in each WCD in various ways and at various times. For instance, at the time of manufacture, distribution, or deployment, a WCD could be provisioned with data that specifies whether the WCD is the type of device that will provide connectivity between at least one other device and the RAN, such as whether the WCD will function as a relay-WCD or will rather function as an non-relay WCD. Further, while in use, the WCD could be provisioned or re-provisioned with such data if the profile, configuration, or status of the WCD changes, such as if an non-relay WCD gets connected and set to function as a relay-WCD. By way of example, a non-relay WCD could be provisioned with data indicating that the WCD does not provide connectivity between at least one other device and the RAN (or, just as well, could lack data that indicates the WCD provides such connectivity). Further, a relay-WCD could be provisioned with data indicating that the WCD is configured to provide such connectivity.

During registration of the WCD or perhaps at some point after, a paging controller of the RAN, such as an MME or MSC, may receive and store this WCD information. The paging controller may receive this WCD information in various ways. For example, the WCD may convey its information to the base station, and the base station may in turn send such WCD information to the paging controller, which the signaling controller may then store in a context record for the WCD as a context record parameter, profile parameter, or the like that is keyed to a WCD identifier such as an International Mobile Subscriber Identity (IMSI) or a public land mobile network (PLMN) ID. Alternatively, the paging controller may receive such WCD information from a home subscriber server (HSS) or a home location register (HLR) and then store the information in the context record for the WCD. Further, as the WCD's information changes, such as if the WCD transitions from being a non-relay WCD to being a relay-WCD, the base station, HSS, or HLR could receive updated data indicating the change, and perhaps forward the updated data to the paging controller.

As further shown, the example RAN includes a paging controller 28, such as an MSC or MME, which functions to control paging as discussed above. The paging controller may comprise a computer or other such automated platform having network communication with various other entities and having a processing unit programmed to carry out various operations as described herein. Further, the paging controller could be integrated with other RAN entities.

In line with the discussion above, the paging controller may be programmed by engineering input with data that divides the base stations in the RAN into groups, each defining a respective tracking area having a respective tracking area ID. As shown in FIG. 1, for example, the base stations are divided into two groups 26a, 26b, where group 26a has one tracking area ID and group 26b has another, different tracking area ID. Each base station may broadcast its tracking area's ID in an overhead message to enable WCDs to detect entry into a new tracking area so as to trigger tracking area updates. To facilitate this in practice, each base station may be programmed by engineering input with its respective tracking area ID and with program logic that causes the base station to broadcast the tracking area ID in its cell.

Further, the paging controller may be programmed by engineering input with data that correlates the various base stations with their respective tracking area IDs. For instance, the paging controller may store a table of data that lists tracking area IDs and that maps each tracking area ID to the base station(s) that are in the tracking area. And for each WCD operating in coverage of any of the illustrated base stations, the paging controller may also store a record of the tracking area in which the WCD is operating.

As noted above, with this tracking area arrangement, when a WCD first powers on or enters into coverage of the RAN and detects a strongest cell, the WCD notes the tracking area ID of that cell and registers with the RAN by transmitting an initial TAU to the RAN, and the paging controller 28 then stores a record of the WCD's serving cell and tracking area. In turn, each time the WCD moves to a new cell, the WCD then determines if the tracking area ID of the new cell is the same as or different than the WCD's current tracking area ID, and the WCD re-registers with the RAN, by transmitting a new TAU to the RAN, only if the tracking area ID is different—so that the paging controller can then update the record to indicate the WCD's new serving cell and new tracking area. For instance, if WCD 16 first registers in cell 14b and later moves into cell 14e from cell 14b, the WCD would detect that the tracking area ID coming from base station 12e is different than the one that was coming from base station 12b and would therefore re-register with the RAN in cell 14e by transmitting a TAU via base station 12e. On the other hand, if WCD 16 later moves into cell 14c from cell 14b, the WCD would detect that the tracking area ID coming from base station 12c is the same as the one that was coming from base station 12b and would therefore not re-register with the RAN and not transmit a TAU.

As a general matter, a WCD's movement from one cell to another could happen for various reasons. For instance, the movement of WCD 16 between coverage of these base stations could result from physical movement of the WCD from one cell to another, from the RAN directing the WCD to hand over to another cell, and/or from changes in radio frequency (RF) conditions in particular cells, leading to changes in signal strength or other factors that trigger WCD transition from one cell to another.

Further, although a relay-WCD such as WCD 18 is fairly stationary as discussed above, the relay-WCD could at some point similarly move between coverage of these base stations as a result of physical movement, direction by the RAN, and/or changes in RF conditions, or could move for other reasons.

In practice, the RAN may at some point detect a trigger to page a WCD such as WCD 16 or WCD 18. This trigger can take various forms. For instance, the RAN may receive a message indicative of a request to provide a communication to the WCD, such as an incoming call or incoming data (e.g., media content). Upon detecting the trigger, the paging controller 28 may then responsively engage in a sequence of attempts to page the WCD until the paging controller completes the sequence or receives an acknowledgement from the WCD, as noted above. Each attempt to page the WCD may take the form of a page message that the paging controller transmits on a downlink paging channel. If the WCD receives the page message, the WCD may then transmit a page response (i.e., acknowledgement) message to the paging controller on an uplink access channel. And upon receipt of the page response message, the RAN may then assign traffic channel resources to the WCD for use to carry the communication so the WCD can engage in the communication.

In particular, with the tracking area arrangement described above, the paging controller may be configured by default to use a zone-based paging process in which the paging controller first attempts to page the WCD in just the WCD's cell of last registration, and then, for each successive page attempt, the paging controller broadens the region in which the WCD is paged to encompass more cells, on grounds that the WCD may have moved to another cell but not yet re-registered. By way of example, assuming the paging controller's record indicates that WCD 16's cell of last registration is cell 14b, when the RAN has a page message to send WCD 16, the paging controller may first transmit to WCD 16 an initial page attempt of the sequence in just cell 14b and may then transmit to WCD 16 a subsequent page attempt in cell 14a and/or 14c. Further, if the RAN cannot reach WCD 16 after the subsequent page attempt, the paging controller may then transmit another subsequent page attempt in even more cells.

As noted above, however, this zone-based paging process can be inefficient in that it involves not only paging in the cell where the WCD is operating but also paging in possibly many other cells where the WCD is not operating, thus unnecessarily burdening the downlink in those other cells. By way of example, if WCD 16 first registers in cell 14b and then moves from cell 14b into cell 14c, WCD 16 would not re-register with the RAN as discussed above, and thus the paging controller's recorded cell of last registration for WCD 16 would still be cell 14b. As such, using the zone-based paging process, the paging controller would first page WCD 16 in cell 14b and, after receiving no response, would likely then attempt to page WCD 16 in cells 14a and/or 14c, even though WCD 16 is not operating in cells 14b and 14a.

As further noted above, a solution to this efficiency problem could be to configure the WCD to re-register with the RAN (e.g., by sending a new TAU) every time the WCD enters a new cell, even if the tracking area ID of the new cell is the same as the WCD's current tracking area ID. With the WCD configured in this way, the paging controller would thus record, as the WCD's new cell of last registration, whichever new cell is identified in the WCD's TAU, and could thus page the WCD using a focused paging process in which the paging controller transmits each page attempt of the sequence in just the WCD's cell of last registration.

As further noted above, this solution could prove useful for paging WCDs that are fairly stationary, such as relay-WCDs that provide connectivity between at least one other device (i.e., non-relay WCD) and the RAN, as noted above. For instance, after a relay-WCD registers in a particular cell, the relay-WCD is more likely to operate in that cell for a long period of time, and thus the RAN is more likely to successfully page the relay-WCD in that cell using the focused paging process.

Accordingly, the present disclosure provides for controlling paging of a WCD based on a consideration of whether the WCD is configured to provide connectivity between at least one other device and the RAN. In line with the discussion above, the disclosed process would be implemented in an arrangement where a WCD that is configured to provide connectivity between at least one other device and the RAN would also be configured to re-register with the RAN (by sending a TAU to the paging controller) every time the WCD enters a new cell, even if the tracking area ID of the new cell is the same as the WCD's current tracking area ID. On the other hand, a WCD that is not configured to provide such connectivity would be configured to re-register with the RAN only when the tracking ID of the new cell is different from the WCD's current tracking area ID.

Per the disclosed process, when the RAN detects a trigger to page the WCD, the paging controller and/or another entity of the RAN will determine whether the WCD is configured to provide connectivity between at least one other device and the RAN and will then use that determination as a basis for deciding whether to page the WCD using the zone-based paging process or rather to page the WCD using the focused paging process. For example, if the paging controller determines that the WCD is a non-relay WCD, the paging controller will decide to use the zone-based paging process to page the WCD, whereas, if the paging controller determines that the WCD is a relay-WCD, the paging controller will decide to use the focused paging process to page the WCD.

To facilitate the disclosed process, the paging controller or another RAN entity could be programmed with logic (e.g., program instructions) executable to determine whether the WCD provides connectivity between at least one other device and the RAN, and, based on that determination, to page the WCD using the zone-based paging process or rather to page the WCD using the focused paging process. For instance, the paging controller or other entity could refer to the context record data discussed above (provided by the WCD itself, or perhaps by the HSS or HLR) that specifies generally whether the WCD provides such connectivity or specifies more particularly that the WCD is a relay-WCD.

Further, the paging controller or other entity could be programmed with mapping data that correlates the zone-based paging process with WCDs that are not configured to provide such connectivity and also correlates the focused paging process with WCDs that are configured to provide such connectivity. Thus, the paging controller or other entity could refer to the context record data to determine whether the WCD is configured to provide such connectivity, and based on what the context record data indicates, could then refer to the mapping data to determine whether to page the WCD using the zone-based paging process or rather using the focused paging process.

Still further, as noted above, the paging controller or other entity could maintain a record of the WCD's cell of last registration and update that record when the paging controller receives a TAU from the WCD. Thus, the paging controller or other entity could refer to the record to determine the WCD's cell of last registration. The paging controller or other entity could determine the WCD's cell of last registration at various points in time before, during, or after the disclosed process, such as in response to detecting a trigger to page the WCD, or in response to determining whether the WCD is configured to provide connectivity between at least one other device and the RAN.

It should be noted that, while the present disclosure primarily discusses a relay-WCD as an example of a fairly stationary WCD configured to provide connectivity between at least one other device and the RAN, other examples of such a WCD are possible as well. For instance, another example of such a WCD is a repeater, such as an active repeater that receives an incoming signal from the RAN, amplifies the signal, and then retransmits the signal to at least one other device (e.g., an end-user WCD that is neither a relay-WCD nor a repeater), or a passive repeater that receives the incoming signal from the RAN and retransmits the signal to at least one other device without amplifying the signal. As such, an example implementation of the disclosed process could involve the RAN determining whether the WCD to be paged is a repeater or a relay-WCD (e.g., by referring to the context record for the WCD), and based on that determination, deciding whether to use the zone-based paging process or the focused paging process. For instance, if the RAN determines that the WCD is a repeater or a relay-WCD, the RAN will responsively page the WCD using the focused paging process, whereas if the RAN determines that the WCD is neither a repeater nor a relay-WCD, the RAN will responsively page the WCD using the zone-based paging process. Other examples are possible as well.

Figure 2:
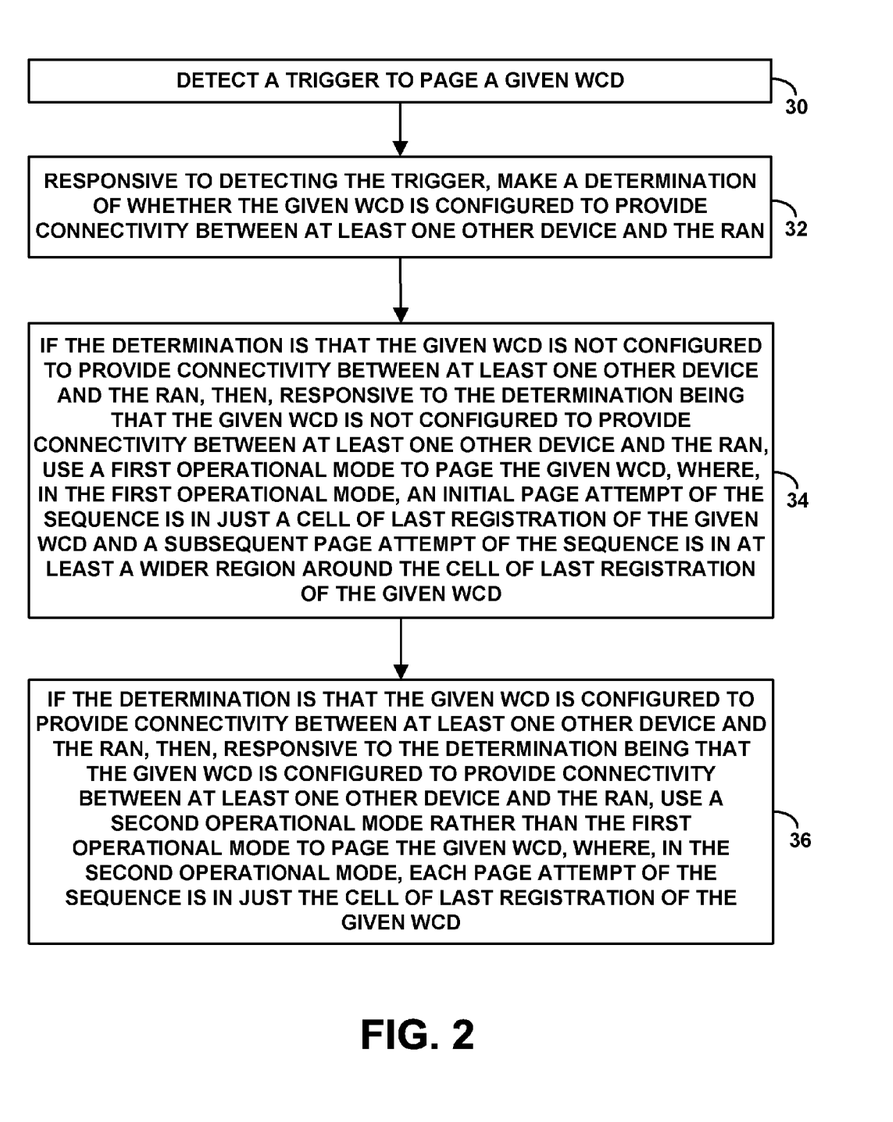
FIG. 2 is a flow chart depicting operations of an example method.

FIG. 2 is next a flow chart depicting operations of an example method for controlling paging by a RAN, where the RAN provides multiple cells in which to serve WCDs (e.g., WCD 16 and relay-WCD 18), and where when the RAN pages a WCD, the RAN engages in a sequence of page attempts until the RAN completes the sequence or receives an acknowledgement from the WCD.

As shown in FIG. 2, at block 30, the method includes the RAN detecting a trigger to page a given WCD. The method also includes, at block 32, responsive to detecting the trigger, the RAN making a determination of whether the given WCD is configured to provide connectivity between at least one other device and the RAN.

Per this method, the RAN then uses the determination as a basis for deciding whether to page the given WCD using the first operational mode or rather using the second operational mode. In particular, the method includes, at block 34, if the determination is that the given WCD is not configured to provide connectivity between at least one other device and the RAN, then, responsive to the determination being that the given WCD is not configured to provide connectivity between at least one other device and the RAN, the RAN using a first operational mode to page the given WCD, where, in the first operational mode, an initial page attempt of the sequence is in just a cell of last registration of the given WCD and a subsequent page attempt of the sequence is in at least a wider region around the cell of last registration of the given WCD. And the method further includes, at block 36, if the determination is that the given WCD is configured to provide connectivity between at least one other device and the RAN, then, responsive to the determination being that the given WCD is configured to provide connectivity between at least one other device and the RAN, the RAN using a second operational mode rather than the first operational mode to page the given WCD, wherein, in the second operational mode, each page attempt of the sequence is in just the cell of last registration of the given WCD.

In line with the discussion above, this method could be carried out by a paging controller of the RAN, such as an MME or MSC. Also in line with the discussion above, the first operational mode may be the zone-based paging process, and the second operational mode may be the focused paging process. Moreover, in some scenarios, the paging controller could be configured by default to use the zone-based paging process to page WCDs, and thus the act of the paging controller using the focused paging process to page a WCD may involve causing the paging controller to reconfigure itself to use the focused paging process, instead of the zone-based paging process, to page the WCD. Alternatively, the act of the paging controller using the focused paging process to page a WCD may involve another RAN entity sending the paging controller a directive interpretable by the paging controller to cause the paging controller to set itself to use the focused paging process.

In practice, the act of making the determination of whether the given WCD is configured to provide connectivity between at least one other device and the RAN may involve making a determination of whether the given WCD is a relay-WCD configured to provide a small-cell base station (e.g., base station 20) of the RAN with wireless backhaul connectivity to the relay-WCD's serving base station (e.g., base station 12d), where the small-cell base station is configured to serve at least one other device (e.g., WCD(s) 22).

Figure 3:
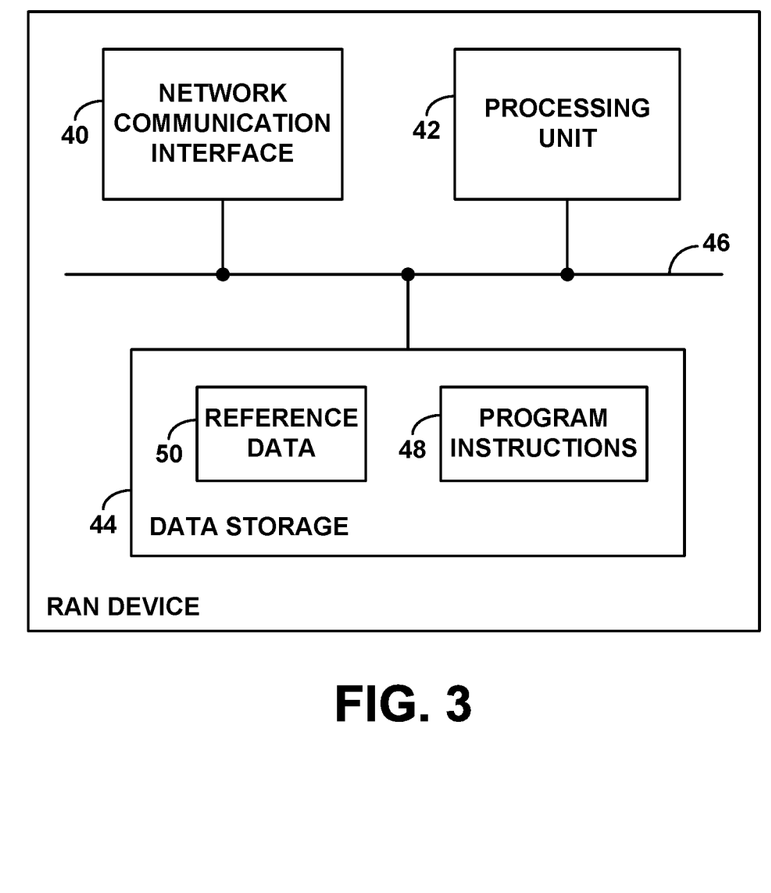
FIG. 3 is a simplified block diagram of an example RAN device operable in accordance with the disclosure.

Finally, FIG. 3 is a simplified block diagram of an example RAN device, showing some of the components that such a device may have to facilitate operations such as those described above. Per the disclosure, the example RAN device could take the form as a paging controller such as an MME or MSC. As shown in FIG. 3, the example RAN device includes a network communication interface 40, a processing unit 42, and non-transitory data storage 44, all of which may be integrated together in various ways or communicatively linked together by a system bus, network, or other connection mechanism 46.

Network communication interface 40 may comprise a wired or wireless Ethernet connection interface or other module that enables the RAN device to communicate with base stations or other network nodes such as those discussed above. Processing unit 42 may then comprise one or more general purpose processors (e.g., microprocessors) and/or one or more special purpose processors (e.g., digital signal processors, application specific integrated circuits, etc.) And data storage 44 may comprise one or more volatile and/or non-volatile storage components, particularly non-transitory storage, such as magnetic, optical, or flash storage.

As shown, data storage 44 may then store program instructions (e.g., machine language instructions or other types of instructions) 48 executable by processing unit 42 to carry out various operations described herein, such as the operations discussed with respect to FIG. 2. For instance, the RAN device may have two mutually exclusive operational modes for paging WCDs, such as a zone-based paging process and a focused paging process, and the operations could include deciding whether to use the zone-based paging processor or rather to use the focused paging process, based on a consideration of whether the WCD at issue is configured to provide connectivity between at least one other device and the RAN.

As additionally shown, the data storage of the RAN device may thus also hold reference data 50 to facilitate operations discussed herein. For example, the reference data 50 could include data that indicates, for each WCD, the base station cell in which the WCD is currently operating and/or the tracking area in which the WCD is currently operating. As another example, the reference data 50 could include mapping data that correlates each of the two paging processes with a respective type of WCD (e.g., a non-relay-WCD or a relay-WCD).

Exemplary embodiments have been described above. Those skilled in the art will understand, however, that changes and modifications may be made to these embodiments without departing from the true scope and spirit of the invention.

What is claimed is:

1. A method for controlling paging by a radio access network (RAN), wherein the RAN provides multiple cells in which to serve wireless client devices (WCDs), wherein when the RAN pages a WCD, the RAN engages in a sequence of page attempts until the RAN completes the sequence or receives an acknowledgement from the WCD, the method comprising:
  detecting by the RAN a trigger to page a given WCD;
  responsive to detecting the trigger, the RAN making a determination of whether the given WCD is configured to provide connectivity between at least one other device and the RAN;
  if the determination is that the given WCD is not configured to provide connectivity between at least one other device and the RAN, then, responsive to the determination being that the given WCD is not configured to provide connectivity between at least one other device and the RAN, using by the RAN a first operational mode to page the given WCD, wherein, in the first operational mode, an initial page attempt of the sequence is in just a cell of last registration of the given WCD and a subsequent page attempt of the sequence is in at least a wider region around the cell of last registration of the given WCD; and
  if the determination is that the given WCD is configured to provide connectivity between at least one other device and the RAN, then, responsive to the determination being that the given WCD is configured to provide connectivity between at least one other device and the RAN, using by the RAN a second operational mode rather than the first operational mode to page the given WCD, wherein, in the second operational mode, each page attempt of the sequence is in just the cell of last registration of the given WCD.

2. The method of claim 1, carried out by a paging controller of the RAN, wherein the paging controller is selected from the group consisting of a mobility management entity (MME) and a mobile switching center (MSC).

3. The method of claim 1, wherein detecting the trigger to page the given WCD comprises receiving a message indicative of a request to provide a communication to the given WCD.

4. The method of claim 1, further comprising:
  receiving by the RAN, from the given WCD, data indicating whether the given WCD is configured to provide connectivity between at least one other device and the RAN; and
  storing by the RAN the data in a context record for the given WCD,
  wherein making the determination of whether the given WCD is configured to provide connectivity between at least one other device and the RAN comprises referring to the context record for the given WCD to make the determination of whether the given WCD is configured to provide connectivity between at least one other device and the RAN.

5. The method of claim 1, wherein the given WCD is being served by a first base station of the RAN, and wherein making the determination of whether the given WCD is configured to provide connectivity between at least one other device and the RAN comprises making a determination whether the given WCD is a relay-WCD configured to provide a second base station of the RAN with wireless backhaul connectivity to the first base station, and wherein the second base station is configured to serve at least one other device.

6. The method of claim 1, further comprising:
  responsive to detecting the trigger, determining by the RAN the cell of last registration of the given WCD.

7. The method of claim 6, further comprising:
  receiving by the RAN a message transmitted from the given WCD upon the given WCD entering into a given cell of the RAN, the message identifying the given cell as the cell of last registration of the given WCD; and
  responsive to receiving the message, storing by the RAN a record that the given cell is the cell of last registration of the given WCD,
  wherein determining the cell of last registration of the given WCD comprises referring to the record to determine the cell of last registration of the given WCD.

8. The method of claim 1, wherein the RAN is selected from the group consisting of an Orthogonal Frequency Division Multiple Access (OFDMA) RAN and a Code Division Multiple Access (CDMA) RAN.

9. A method for controlling paging by a radio access network (RAN), wherein the RAN provides multiple cells in which to serve wireless client devices (WCDs), wherein when the RAN pages a WCD, the RAN engages in a sequence of page attempts until the RAN completes the sequence or receives an acknowledgement from the WCD, wherein the RAN has two mutually exclusive operational modes for use in the RAN paging the WCD: (i) a first operational mode in which an initial page attempt of the sequence is in just a cell of last registration of the WCD and a subsequent page attempt of the sequence is in at least a wider region around the cell of last registration of the WCD and (ii) a second operational mode in which each page attempt of the sequence is in just the cell of last registration of the WCD, the method comprising:
  detecting by the RAN a trigger to page a given WCD;
  responsive to detecting the trigger, the RAN making a determination of whether the given WCD is configured to provide connectivity between at least one other device and the RAN;
  based on the determination of whether the given WCD is configured to provide connectivity between at least one other device and the RAN, the RAN making a decision whether to use the first operational mode to page the given WCD or instead to use the second operational mode to page the given WCD; and
  the RAN paging the given WCD in accordance with the decision.

10. The method of claim 9, carried out by a paging controller of the RAN, wherein the paging controller is selected from the group consisting of a mobility management entity (MME) and a mobile switching center (MSC).

11. The method of claim 9, wherein detecting the trigger to page the given WCD comprises receiving a message indicative of a request to provide a communication to the given WCD.

12. The method of claim 9, further comprising:
  receiving by the RAN, from the given WCD, data indicating whether the given WCD is configured to provide connectivity between at least one other device and the RAN; and
  storing by the RAN the data in a context record for the given WCD,
  wherein making the determination of whether the given WCD is configured to provide connectivity between at least one other device and the RAN comprises referring to the context record for the given WCD to make the determination of whether the given WCD is configured to provide connectivity between at least one other device and the RAN.

13. The method of claim 9, wherein the given WCD is being served by a first base station of the RAN, and wherein making the determination of whether the given WCD is configured to provide connectivity between at least one other device and the RAN comprises making a determination whether the given WCD is a relay-WCD configured to provide a second base station of the RAN with wireless backhaul connectivity to the first base station, and wherein the second base station is configured to serve at least one other device.

14. The method of claim 9, further comprising:
receiving by the RAN a message transmitted from the given WCD upon the given WCD entering into a given cell of the RAN, the message identifying the given cell as the cell of last registration of the given WCD; and
responsive to receiving the message, storing by the RAN a record that the given cell is the cell of last registration of the given WCD,
wherein determining the cell of last registration of the given WCD comprises referring to the record to determine the cell of last registration of the given WCD.

15. The method of claim 9, wherein the RAN is configured by default to use the first operational mode to page WCDs,
wherein making the decision to instead use the second operational mode to page the given WCD comprises making a decision to reconfigure the RAN to use the second operational mode instead of the first operational mode to page the given WCD, and
wherein paging the given WCD in accordance with the decision comprises using the second operational mode to page the given WCD.

16. A radio access network (RAN) device for controlling paging of wireless client devices (WCDs) in a RAN that provides multiple cells in which to serve WCDs, wherein when the RAN pages a WCD, the RAN engages in a sequence of page attempts until the RAN completes the sequence or receives an acknowledgement from the WCD, and wherein the RAN device has a first operational mode in which an initial page attempt of the sequence is in just a cell of last registration of the given WCD and a subsequent page attempt of the sequence is in at least a wider region around the cell of last registration of the given WCD, and the RAN device has a second operational mode in which each page attempt of the sequence is in just the cell of last registration of the given WCD, the RAN device comprising:
a network communication interface;
a processing unit;
data storage; and
program instructions stored in the data storage and executable by the processing unit to carry out operations comprising:
detecting a trigger to page a given WCD;
responsive to detecting the trigger, making a determination of whether the given WCD is configured to provide connectivity between at least one other device and the RAN;

if the determination is that the given WCD is not configured to provide connectivity between at least one other device and the RAN, then, responsive to the determination being that the given WCD is not configured to provide connectivity between at least one other device and the RAN, using the first operational mode rather than the second operational mode to page the given WCD; and
if the determination is that the given WCD is configured to provide connectivity between at least one other device and the RAN, then, responsive to the determination being that the given WCD is configured to provide connectivity between at least one other device and the RAN, using the second operational mode rather than the first operational mode to page the given WCD.

17. The RAN device of claim 16, the operations further comprising:
maintaining in the data storage a record for the given WCD, the record including the cell of last registration of the given WCD.

18. The RAN device of claim 16, wherein the RAN device is selected from the group consisting of a mobility management entity (MME) and a mobile switching center (MSC), and
wherein the RAN is selected from the group consisting of an Orthogonal Frequency Division Multiple Access (OFDMA) RAN and a Code Division Multiple Access (CDMA) RAN.

19. The RAN device of claim 16, the operations further comprising:
receiving from the given WCD data indicating whether the given WCD is configured to provide connectivity between at least one other device and the RAN; and
storing, in the data storage, the data in a context record for the given WCD,
wherein making the determination of whether the given WCD is configured to provide connectivity between at least one other device and the RAN comprises referring to the context record for the given WCD to make the determination of whether the given WCD is configured to provide connectivity between at least one other device and the RAN.

20. The RAN device of claim 16, wherein the given WCD is being served by a first base station of the RAN, and wherein making the determination of whether the given WCD is configured to provide connectivity between at least one other device and the RAN comprises making a determination whether the given WCD is a relay-WCD configured to provide a second base station of the RAN with wireless backhaul connectivity to the first base station, and wherein the second base station is configured to serve at least one other device.

* * * * *